(12) United States Patent
Gruenauer et al.

(10) Patent No.: US 12,410,345 B2
(45) Date of Patent: Sep. 9, 2025

(54) POLYVINYL AROMATE-POLYDIENE-BLOCK COPOLYMER-BASED ADHESIVE COMPOUNDS HAVING IMPROVED THERMAL SHEAR STRENGTH

(71) Applicant: tesa SE, Norderstedt (DE)

(72) Inventors: Judith Gruenauer, Hamburg (DE); Thilo Dollase, Hamburg (DE); Bernd Luehmann, Norderstedt (DE); Jessika Gargiulo, Hamburg (DE)

(73) Assignee: tesa SE, Nordersted (DE)

( * ) Notice: Subject to any disclaimer, the term of this patent is extended or adjusted under 35 U.S.C. 154(b) by 214 days.

(21) Appl. No.: 18/275,940

(22) PCT Filed: Feb. 7, 2022

(86) PCT No.: PCT/EP2022/052855
§ 371 (c)(1),
(2) Date: Aug. 4, 2023

(87) PCT Pub. No.: WO2022/167646
PCT Pub. Date: Aug. 11, 2022

(65) Prior Publication Data
US 2024/0117223 A1    Apr. 11, 2024

(30) Foreign Application Priority Data

Feb. 5, 2021   (DE) .................. 10 2021 201 094

(51) Int. Cl.
| B32B 41/00 | (2006.01) |
| C09J 7/26 | (2018.01) |
| C09J 7/38 | (2018.01) |
| C09J 11/08 | (2006.01) |
| C09J 153/02 | (2006.01) |

(52) U.S. Cl.
CPC .............. *C09J 7/387* (2018.01); *C09J 7/26* (2018.01); *C09J 11/08* (2013.01); *C09J 153/02* (2013.01); *C09J 2301/302* (2020.08); *C09J 2301/312* (2020.08); *C09J 2301/408* (2020.08); *C09J 2301/50* (2020.08)

(58) Field of Classification Search
CPC ..... C09J 7/387; C09J 7/26; C09J 11/08; C09J 153/02; C09J 2301/302; C09J 2301/312; C09J 2301/408; C09J 2301/50; C09J 2203/346; C09J 2203/354; C09J 2453/00; C08L 2312/00; C08L 23/24; C08K 5/098; C08K 5/1515
USPC .................... 156/60, 64, 350, 351, 378, 379
See application file for complete search history.

(56) References Cited

U.S. PATENT DOCUMENTS

| 3,729,313 A | 4/1973 | Smith |
| 3,741,769 A | 6/1973 | Smith |
| 4,058,401 A | 11/1977 | Crivello |
| 4,138,255 A | 2/1979 | Crivello |
| 4,231,951 A | 11/1980 | Smith et al. |
| 4,250,053 A | 2/1981 | Smith |
| 4,256,828 A | 3/1981 | Smith |
| 4,394,403 A | 7/1983 | Smith |
| 5,089,536 A | 2/1992 | Palazzotto |
| 5,242,715 A | 9/1993 | Schoen et al. |
| 5,372,870 A | 12/1994 | Diehl et al. |
| 6,908,722 B2 | 6/2005 | Ebata et al. |
| 7,429,419 B2 | 9/2008 | Ring et al. |
| 8,790,779 B2 | 7/2014 | Bilcai et al. |
| 10,717,905 B2 | 7/2020 | Kopf et al. |
| 10,793,751 B2 | 10/2020 | Dollase et al. |
| 2010/0063221 A1 | 3/2010 | Manabe et al. |
| 2014/0024756 A1 | 1/2014 | Krawinkel et al. |
| 2014/0315016 A1 | 10/2014 | Dollase et al. |
| 2014/0367670 A1 | 12/2014 | Yamamoto et al. |
| 2018/0148618 A1* | 5/2018 | Osterwinter ........... C09J 153/02 |
| 2018/0194978 A1 | 7/2018 | Dollase et al. |
| 2023/0312994 A1* | 10/2023 | Dollase .................. C09J 133/10 156/332 |
| 2023/0374354 A1* | 11/2023 | Tasche ................ C09J 153/025 |

FOREIGN PATENT DOCUMENTS

| DE | 10 2008 056 980 A1 | 5/2010 |
| DE | 10 2009 026 548 A1 | 3/2011 |
| DE | 10 2012 202 377 A1 | 4/2013 |
| DE | 10 2012 212 879 A1 | 1/2014 |
| DE | 10 2015 109 659 A1 | 12/2016 |
| DE | 10 2015 212 058 A1 | 12/2016 |
| DE | 10 2016 202 018 A1 | 8/2017 |
| DE | 10 2018 202 545 A1 | 8/2019 |
| EP | 0 393 893 A1 | 10/1990 |
| EP | 0 542 716 B1 | 6/1997 |
| JP | 2000-290619 A | 10/2000 |
| JP | 2012-056915 A | 3/2012 |
| JP | 2014-062057 A | 4/2014 |
| JP | 2018-002950 A | 1/2018 |
| WO | 99/09101 A1 | 2/1999 |
| WO | 00/22062 A1 | 4/2000 |
| WO | 00/24840 A1 | 5/2000 |
| WO | 2013/156509 A2 | 10/2013 |
| WO | 2020/048799 A1 | 3/2020 |

* cited by examiner

*Primary Examiner* — Michael N Orlando
*Assistant Examiner* — Joshel Rivera
(74) *Attorney, Agent, or Firm* — Norris McLaughlin, P.A.

(57) ABSTRACT

The invention relates to polyvinal aromate-polydiene-block copolymer-based adhesive compounds that contain at least one type of a cationically curable reactive resin and that result, when cured, in improved thermal shear strength. The invention further relates to adhesive strips that contain at least one layer of such an adhesive compound, and a method of production.

14 Claims, No Drawings

POLYVINYL AROMATE-POLYDIENE-BLOCK COPOLYMER-BASED ADHESIVE COMPOUNDS HAVING IMPROVED THERMAL SHEAR STRENGTH

This application is a 371 of International Patent Application No. PCT/EP2022/052855, filed Feb. 7, 2022, which claims priority of German Patent Application No. 10 2021 201 094.6, filed Feb. 5, 2021, the disclosures of which patent applications are hereby incorporated herein by reference.

The invention relates to pressure sensitive adhesives (PSAs) based on polyvinylaromatic-polydiene block copolymers which contain at least one kind of a cationic curable reactive resin which on curing produces an enhancement of the thermal shear strength. The invention additionally relates to adhesive tapes which contain at least one layer of such a PSA, and to a process for producing them.

Polyvinylaromatic-polydiene block copolymer-based PSAs are one of the commonplace PSA families for self-adhesive products. They can be used advantageously for bonding a broad range of materials to be bonded, including apolar materials. Exhibiting high peel adhesion forces at customary usage temperatures, they exhibit good cohesion at the same time. Polyvinylaromatic-polydiene block copolymer-based PSAs can be processed solventlessly from the melt and also from solution.

For many applications, such as in the automotive sector, for example, there is a continual demand for improvement in the thermal shear strength of PSAs based on commercially available polyvinylaromatic-polydiene block copolymers, this being associated with the specific physical crosslinking principle in these formulations. As a result of deliberately utilised incompatibility between the different kinds of blocks and their separation, polyvinylaromatic-rich regions are formed which, in temperature ranges below their glass transition temperature, serve as crosslinking points. If the glass transition temperature is reached, the cohesion drops. There continues to be demand for formulations for self-adhesive tapes which exhibit an excellence balance between high thermal shear strength and good peel adhesion.

A variety of approaches have been described as to how it is possible to achieve improvements in relation to the thermal shear strength of polyvinylaromatic-polydiene block copolymer-based formulations.

For instance, the thermal shear strength of the PSA formulation can be improved through influence on molar mass (DE 10 2012 212 879 A1) and architecture (U.S. Pat. No. 5,372,870 A) of the polyvinylaromatic-polydiene block copolymers.

Also included here is the use of high-softening-temperature adjuvants that are miscible with the polyvinylaromatic-rich domains. WO 00/24840 A1 claims polyphenylene oxide resin for this purpose. Eastman Chemical describes high-softening aromatic resins in a Technical Bulletin ("Kristalex and Endex Hydrocarbon Resins for Improved PSA Performance", Eastman Chemical Company, Document Number TT-85, August 2007).

Also described is the radiochemical crosslinking of the polyvinylaromatic-polydiene-based formulations, both without (WO 00/22062 A1) and with additional crosslinkers (DE 10 2008 056 980 A1). Crosslinkers are customarily used in small amounts below 10 wt %, as claimed for example in DE 10 2015 109 659 A1 (0.05 to 5 wt % of crosslinking assistant). The crosslinking here is via a radical mechanism and results in covalent (chemical) linking of elastomer molecules.

Block copolymers in combination with epoxide resins are known from descriptions relating to reactive coating materials. After curing, epoxy-based reactive coating materials typically have a high hardness but also brittleness. Adhesives and coating materials of this kind may be impact-modified by addition of thermoplastic elastomers, as is set out for example in DE 10 2009 026 548 A1. The majority component in systems of this kind, which are also referred to as casting or potting compounds, are customarily the epoxides (Thomas, S., Sinturel, C., & Thomas, R. (Eds.). (2014). Micro and nanostructured epoxy/rubber blends. John Wiley & Sons).

Formulations with polyvinylaromatic block copolymers and epoxides are known from DE 10 2012 202 377 A1 and DE 10 2015 212 058 A1. The formulations claimed here are based on polystyrene-polyisobutylene block copolymers, particularly for water vapour barrier adhesives. Epoxides are described as reactive diluents which before the curing lead to very good laminatability of the adhesive tapes and which through curing develop their ultimate performance profile. The curing here takes place either radiation-chemically or thermally. Polydiene-based adhesives are not disclosed in these documents. Polyvinylaromatic-polydiene block copolymer-based formulations are not stated.

JP 2000/290 619 A1 describes formulations with an elastomer (100 parts by weight), a cationically curable material such as epoxide (10 to 200 parts by weight), for example, and a photocationic polymerization initiator. A combination specifically given is that of 100 parts by weight of an SBS (Tufprene A and/or Epofriend A1010) with 120 parts by weight of the glycidyl ether Epicoat 828. Tufprene A and Epofriend A1010 have a polystyrene (PS) fraction of 40%. The disclosure indicates that the adhesive tapes are reactive adhesive tapes which are brought to cure immediately before the bonding of the target assembly. Curing of such formulations independently of lamination immediately thereafter presumably leads to layers which are no longer tacky. Compositions for self-adhesive tapes which exhibit an excellent balance between high thermal shear strength and good peel adhesion are not taught by this disclosure.

JP 2018/002 950 A1 claims adhesives based on styrene block copolymers with an epoxide resin, a curing agent and 1-cyanoethyl-2-ethyl-4-methylimidazole as curing accelerator for the epoxy resin for heat-sealing films.

WO 1999/009101 A1 and U.S. Pat. No. 7,429,419 B2 disclose adhesives with an epoxy resin and an epoxide-group-functionalised block copolymer.

DE 10 2018 202 545 A1 claims specific formulations based in particular on polystyrene-polyisobutylene block copolymers, likewise containing epoxides. Advantageously, however, these epoxides may also be cured thermally and/or by radiation even prior to lamination. Polyvinylaromatic-polydiene block copolymer-based formulations are not stated.

The object continues to be that of providing formulations for self-adhesive tapes which exhibit an excellent balance between high thermal shear strength, more particularly a SAFT temperature according to Test I of at least 150° C., and good peel adhesion according to Test II of at least 4 N/cm.

Although various sources provide proposed formulations comprising combinations of block copolymers and epoxy resins, the requirement that is imposed on formulations for self-adhesive tapes, namely an excellent balance between high thermal shear strength and good peel adhesion, cannot be achieved through just any selection of block copolymers and epoxy resins. It has emerged as being all the more surprising that the requirements imposed can be achieved by means of formulations, i.e. pressure sensitive adhesives, with a base formulation containing (i) 25 to 45 wt %, preferably 30 to 40 wt %, of at least one elastomer component containing at least one polyvinylaromatic-polydiene block copolymer,
where the polyvinylaromatic-polydiene block copolymer at least fractionally has an A-B-A, $(A-B)_n$, $(A-B)_nX$ or $(A-B-A)_nX$ structure, in which
the blocks A independently of one another are a polymer formed by polymerisation of at least one vinylaromatic,
the blocks B independently of one another are a polymer formed by polymerisation of conjugated dienes having 4 to 18 carbon atoms or are a derivative of such a polymer that is partially hydrogenated in the polydiene block,
X is the residue of a coupling reagent or initiator and n is an integer 2,
where the peak molar mass of the at least one polyvinylaromatic polydiene block copolymer according to Test IVa is at least 160 000 g/mol, preferably at least 200 000 g/mol,
where the fraction of A blocks in the at least one polyvinylaromatic polydiene block copolymer is at least 8 wt % and at most 25 wt % and
where optionally there may be a fraction of diblock copolymer A-B, containing blocks A and B as defined above, of at most 25 wt %, based on the total elastomer component,
(ii) 33 to 55 wt %, preferably 40 to 50 wt %, of at least one tackifier resin component with at least one tackifier resin, where the at least one tackifier resin has a softening temperature (Ring & Ball, Test VII) of 80° C., preferably 100° C. and more preferably up to 130° C., and
(iii) 13 to 30 wt %, preferably 16 to 25 wt %, of at least one reactive resin component containing at least 70 wt % of at least one reactive resin based on a cyclic ether having a dispersive component of the Hansen parameter, $\delta_D$, of 17.82 to 17.50 $MPa^{1/2}$, preferably 17.80 to 17.70 $MPa^{1/2}$,
based in each case on the base formulation and the sum of the elastomer component and the reactive resin component is at least 38 wt % and at most 68 wt %.

In the base formulation of the invention, the weight fractions of the elastomer component, tackifier resin component and reactive resin component add up to 100 wt %. The sum total of elastomer component and reactive resin component, moreover, is at least 38 wt % and at most 68 wt %, preferably at least 50 wt % and at most 60 wt %, based in each case on the base formulation of the invention. If the base formulation, as is preferred in the invention, contains solvent, the solvent is disregarded when reporting the weight fractions.

The formulation also contains an initiator for the cationic curing (curing component) of the reactive resin component, and also, optionally, further constituents such as plasticizers and/or additives. The total PSA formulation is therefore composed of base formulation, curing component and optionally further constituents. The terms "pressure sensitive adhesive" and "self-adhesive composition" are used synonymously for the purposes of the present specification.

The present invention relates, moreover, to a cured pressure sensitive adhesive obtainable or obtained by curing a pressure sensitive adhesive as described above.

It also relates to an adhesive tape which comprises at least one layer of a PSA as described above or cured PSA. If the adhesive tape contains a carrier, then the PSA is preferably applied over the full area thereof. The present invention, however, also embraces embodiments in which the PSA is applied only over part of the area.

The present invention relates, furthermore, to a process for producing such an adhesive tape, in which a solvent-borne adhesive is coated and dried and the thermal curing of the adhesive takes place or is initiated during the drying operation.

Preferred embodiments of the stated subjects are found in the dependent claims.

Pressure Sensitive Adhesive:

The constituents of the pressure sensitive adhesive (PSA) of the invention are elucidated in more detail below.

(a) Base Formulation—(i) Elastomer Component:

The elastomer component contains at least one polyvinylaromatic-polydiene block copolymer. The polyvinylaromatic-polydiene block copolymer is preferably a polystyrene-polydiene block copolymer and here especially a polystyrene-polybutadiene, polystyrene-polyisoprene or polystyrene-polyfarnesene block copolymer, such as more particularly a polystyrene-polybutadiene block copolymer.

The polyvinylaromatic-polydiene block copolymer has at least proportionately an A-B-A, $(A-B)_n$, $(A-B)_nX$ or $(A-B-A)_nX$ structure, in which
the blocks A independently of one another are a polymer formed by polymerisation of at least one vinylaromatic;
the blocks B independently of one another are a polymer formed by polymerisation of conjugated dienes having 4 to 18 carbon atoms or are a derivative of such a polymer that is partially hydrogenated in the polydiene block;
X is the residue of a coupling reagent or initiator and n is an integer 2.

In the present specification, a triblock copolymer refers typically to a block copolymer having an A-B-A or $(A-B)_2X$ structure. Similarly, in the present specification, a radial block copolymer refers typically to a block copolymer having an $(A-B)_nX$ or $(A-B-A)_nX$ structure in which n is an integer 3. Preferred radial block copolymers here have a structure $(A-B)_nX$ in which n is an integer 3. In the present specification, the terms "radial", "star-shaped" and "multi-arm" are used synonymously.

Suitable block copolymers (vinylaromatic block copolymers) thus comprise one or more rubber-like blocks B (soft blocks). At least one block copolymer has two or more glass-like blocks A (hard blocks). The elastomer component preferably contains at least one triblock copolymer A-B-A or $(A-B)_2X$ and/or at least one radial $(A-B)_nX$ block copolymer in which n is an integer 3. Particular preference is given here to a mixture of at least one triblock copolymer A-B-A or $(A-B)_2X$ and at least one radial $(A-B)_nX$ block copolymer. In the radial $(A-B)_nX$ block copolymer, n is preferably 3 or 4. In accordance with this, at least one block copolymer preferably has a structure A-B-A, $(A-B)_2X$, $(A-B)_3X$ or $(A-B)_4X$, with A, B and X being subject to the definitions above. In one advantageous version, all block copolymers have a structure A-B-A, $(A-B)_2X$, $(A-B)_3X$ or $(A-B)_4X$ with A, B and X being subject to the definitions above. It is, however, also advantageous if the elastomer component consists of a mixture of block copolymers with a structure A-B-A, $(A-B)_2X$, $(A-B)_3X$ or $(A-B)_4X$ and of block copolymers with a different architecture, such as, in minor amounts, diblock copolymers A-B.

A blocks are also referred to in the context of this invention as "hard blocks". B blocks, correspondingly, are also called "soft blocks" or "elastomer blocks". This reflects the selection of the blocks, in accordance with the invention, on the basis of their glass transition temperatures (for A blocks at least 25° C., preferably at least 50° C. and more particularly at least 75° C., and for B blocks at most 0° C., more particularly at most −50° C., such as at most −75° C., for example, determined in each case via DSC, Test III).

It is also possible to utilise diblock copolymers A-B in combination with the stated block copolymers. It has emerged, however, that too high a fraction of diblock copolymers leads to a thermal shear strength which does not match the requirement. The fraction of diblock copolymer in the elastomer component is therefore at most 25 wt %, very preferably at most 20 wt %. It is also possible to do without diblock copolymer entirely. A high diblock fraction, from addition of a diblock-rich vinylaromatic block copolymer, for example, surprisingly leads not only to a deterioration in the thermal shear strength but also to a decrease in the peel adhesion.

The at least one block copolymer typically contains on the one hand polymer blocks predominantly formed of vinylaromatics (A blocks), preferably polystyrene, and on the other hand those predominantly formed by polymerisation of 1,3-dienes (B blocks), such as butadiene and isoprene, for example, or a copolymer thereof. The products here may also be partially hydrogenated in the diene block. With regard to partially hydrogenated derivatives, particularly suitable block copolymers are those in which in particular any vinyl groups, i.e. repeat units which were present in unsaturated form in the side chain, such as 1,2-polybutadiene, 1,2-polyisoprene or 3,4-polyisoprene, have been hydrogenated, i.e. are ultimately present in hydrogenated form. An example of such partially hydrogenated block copolymers are polystyrene-polybutylene-butadiene block copolymers (SBBS).

The block copolymers of the PSAs preferably possess polystyrene endblocks.

Vinylaromatics for constructing the block A comprise preferably styrene, α-methylstyrene and/or other styrene derivatives. The block A may be in homo- or copolymer form. The block A more preferably is a polystyrene.

As vinylaromatics, instead of the preferred polystyrene blocks, it is also possible to utilise polymer blocks based on other aromatic-containing homo- and copolymers (preferably $C_8$ to $C_{12}$ aromatics) having glass transition temperatures of greater than 75° C., such as α-methylstyrene-containing aromatic blocks, for example. Additionally, identical or different A blocks may also be present.

The fraction of A blocks in the at least one block copolymer of the elastomer component is at least 8 wt % and at most 25 wt %.

Preferred conjugated dienes as monomers for the soft block B are selected in particular from the group consisting of butadiene, isoprene, farnesene, ethylbutadiene, phenylbutadiene, piperylene, pentadiene, hexadiene, ethylhexadiene and dimethylbutadiene and also any desired mixtures of these monomers. The block B as well may take the form of a homopolymer or a copolymer.

The conjugated dienes as monomers for the soft block B are more preferably selected from butadiene and isoprene. For example, the soft block B is a polyisoprene, a polybutadiene or a partially hydrogenated derivative of one of these two polymers, such as polybutylene-butadiene in particular, or is a polymer of a mixture of butadiene and isoprene. Very preferably, the block B is a polybutadiene.

The peak molar mass of the at least one polyvinylaromatic polydiene block copolymer according to Test IVa is at least 160 000 g/mol, preferably—and especially on selection of a polystyrene-polybutadiene block copolymer—at least 200 000 g/mol.

(a) Base Formulation—(ii) Tackifier Resin Component:

A "tackifier resin" is understood in accordance with the general understanding of the skilled person to be an oligomer or polymer resin which raises the adhesion (the tack, the intrinsic stickiness) of the PSA by comparison with the otherwise identical PSA containing no tackifier resin.

The molar mass (according to Test IVb) of tackifier resins is customarily between 500 and 5000 g/mol.

The tackifier resins used in the invention are advantageously those which are compatible with the soft blocks of the polyvinylaromatic-polydiene block copolymers of the elastomer component.

Accordingly, to an extent of preferably at least 90 wt %, more preferably at least 95 wt % (based on the tackifier resin component), a tackifier resin is selected which has a DACP (diacetone alcohol cloud point, Test V) of greater than +5° C., preferably greater than +10° C., and less than +65° C. (if there is a polyisoprene block copolymer in the elastomer part), preferably less than +50° C. (if there is no polyisoprene block copolymer in the elastomer part). Likewise preferably, the at least one tackifier resin has an MMAP (mixed methylcyclohexane aniline point, Test VI) of at least +50° C., more preferably of at least +60° C., and of at most +100° C. (if there is a polyisoprene block copolymer in the elastomer part), more preferably of at most +90° C. (if there is no polyisoprene block copolymer in the elastomer part). The at least one tackifier resin has a softening temperature (Ring & Ball, Test VII) of 80° C., preferably 100° C. and more preferably up to 130° C.

It has been found that as tackifier resin for the PSA(s) it is possible advantageously to make use in particular of apolar hydrocarbon resins such as, for example, hydrogenated and non-hydrogenated polymers of dicyclopentadiene, non-hydrogenated or partially, selectively or fully hydrogenated hydrocarbon resins based on $C_5$, $C_5/C_9$ or $C_9$ monomer streams, polyterpene resins based on α-pinene and/or β-pinene and/or δ-limonene. Aforesaid tackifier resins may be used either alone or in a mixture. Hydrocarbon resins or polyterpene resins are used preferably to an extent of at least 90 wt %. Tackifier resins, hydrogenated or non-hydrogenated, which also contain oxygen may optionally be used up to a maximum fraction of 10%, based on the tackifier resin component, in the adhesive.

More preferably the tackifier resins are exclusively hydrocarbon resins or terpene resins or a mixture thereof.

(a) Base Formulation—(iii) Reactive Resin Component:

The object on which the invention is based is achieved through combination of particular polyvinylaromatic-polydiene block copolymers with particular reactive resins. Without being tied to the theory, one possible approach at explaining why only particular representatives of the two groups of raw materials lead to advantageous adhesive properties may involve selective compatibility of the reactive resins with the polyvinylaromatic-rich domains, where, in cured form, they stabilise, even at elevated temperatures, the state of crosslinking formed due to microphase separation.

Correspondingly, the reactive resin component contains at least 70 wt % of at least one reactive resin based on a cyclic ether with a dispersive component of the Hansen parameter, $\delta_D$; of 17.82 to 17.50 MPa$^{1/2}$, preferably 17.80 to 17.70 MPa$^{1/2}$. Here, the dispersive component of the Hansen parameter, $\delta_D$, of the reactive resin differs preferably by at most 2 MPa$^{1/2}$ from the dispersive component of the Hansen parameter, $\delta_D$, of the polyvinylaromatic of the at least one polyvinylaromatic-polydiene block copolymer.

The solubility parameter δ in the three-dimensional Hansen solubility space is defined as follows (Eric A. Grulke in "Polymer Handbook", 3$^{rd}$ edition, Chapter VII, pp. 519-559):

$\delta=(\delta_D^2+\delta_P^2+\delta_H^2)^{1/2}$, where $\delta_D$ describes the attraction due to spontaneous polymerisation of a particle and consequently induced dipoles in adjacent particles (cf. London dispersion), $\delta_P$ relates to the Debye attraction of permanent dipoles, and $\delta_H$ describes specific interactions such as hydrogen bonds or acid-base interactions.

Calculations in relation to the Hansen parameter are carried out in the invention by means of the HSPiP software (http://hansen-solubility.com). This software uses a group contribution method approach based on the functional units of the molecule.

Reactive resins based on a cyclic ether are preferred for thermal and/or radiochemical curing, i.e. by way of photoinitiators. The reactive resin is cationically curable. The reactive resins based on cyclic ethers are preferably epoxides, these being compounds which carry at least one oxirane group, or oxetanes. Epoxides are particularly preferred. The cyclic ethers are typically aliphatic or cycloaliphatic in nature, with cycloaliphatic epoxides being particularly preferred. A cyclic ether cycloaliphatic in nature typically refers in the invention to the fact that the cyclic ether is fused to the cycloaliphatic moiety. Reactive resins that can be used may be monofunctional, difunctional, trifunctional, tetrafunctional or of higher functionality up to polyfunctional, with the functionality referring to the cyclic ether group. Diepoxides are particularly preferred. Preferred examples, without wishing to impose any limitation, are 3,4-epoxycyclohexylmethyl 3',4'-epoxycyclohexanecarboxylate (EEC) and derivates. Reactive resins may be used in their monomeric or else dimeric, trimeric, etc. through to their oligomeric form. Very preferably, EEC is used.

Investigations have shown that the solubility property of (3,4-epoxycyclohexyl)methyl 3,4-epoxycyclohexylcarboxylate is particularly advantageous for embedding into the styrene domains of the synthetic rubber. Table 1 shows the Hansen parameters of polystyrene and various diepoxides, and also the difference Δ of the delta values of the Hansen parameters of the diepoxides in comparison to polystyrene.

boxylate. This means that the cohesion of the specimens decreases.

In connection with the stated object, aromatic epoxy resins, surprisingly, are unsuitable for incorporation in the styrene domain, and form a third phase in the SBC epoxy blend. This can be concluded from AFM images and is apparent in severe turbidity of the specimen. The result is particularly surprising with regard to formulation of a blend, since the expectation might have been that aromatic epoxides would have particularly good compatibility with the aromatic styrene domain and ought therefore to have a positive effect in the sense of the objective. This, however, could not be shown.

Mixtures of reactive resins with one another or else with other co-reactive compounds such as alcohols (monofunctional or multiply functional) or vinyl ethers (monofunctional or multiply functional) are likewise possible.

(b) Initiator for the Cationic Curing of the at Least One Reactive Resin:

The PSA of the invention further comprises an initiator, also called activator, without which the curing of the reactive resin under economically rational conditions is not possible. The initiator is present typically in an amount of 0.1 to 5 wt %, based on the amount of reactive resin component.

The initiator is typically selected from thermally activatable initiators for initiating a cationic curing, photoinitiators, i.e. radiation-activatable initiators such as UV initiators in particular, for initiating cationic curing, and also mixtures of these. Such initiators are known to the skilled person. The fraction of the thermally activatable initiators in relation to the reactive resin component here is preferably at least 0.2 wt % and at most 4.0 wt % and more preferably at least 0.3 wt % and at most 2.5 wt %. The fraction of radiation-activatable initiators in relation to the reactive resin here is preferably at least 0.2 wt % and at most 5 wt % and more preferably at least 0.5 wt % and at most 4 wt %.

The selection of suitable thermal initiators, if such are employed, for the cationic curing of the reactive resins poses a particular challenge. The temperature needed to activate the thermal initiator ought to be located in a range in which the adhesive can be cured in a sufficiently short time. Accordingly, it should be in line with the production process employed for the self-adhesive tapes.

This may be done in particular by solvent-based coatings of the adhesive formulation. The thermally activatable initiator for the cationic curing ought advantageously to lead to curing of the reactive resin in the temperature range of the

TABLE 1

Hansen parameters of polystyrene and various diepoxides and delta values relating to them.

|  | $\delta_D$ | $\delta_P$ | $\delta_H$ | Difference relative to polystyrene | | |
| --- | --- | --- | --- | --- | --- | --- |
|  |  |  |  | $\Delta\delta_D$ | $\Delta\delta_P$ | $\Delta\delta_H$ |
| Polystyrene | 18.7 | 0.6 | 2.1 |  |  |  |
| (3,4-Epoxycyclohexyl) methyl-3,4-epoxycyclohexylcarboxylate | 17.74 | 6.46 | 5.56 | 0.96 | −5.86 | −3.46 |
| Neopentyl glycol diglycidyl ether | 17.64 | 6.99 | 7.01 | 1.06 | −6.39 | −4.91 |
| Dicyclopentadiene diepoxide | 17.84 | 5.83 | 3.71 | 0.86 | −5.23 | −1.61 |
| Perhydrobisphenol A diglycidyl ether | 17.42 | 5.66 | 4.05 | 1.28 | −5.06 | −1.95 |

The crosslinking of the cycloaliphatic epoxides in the styrene domain decreases with distance from the ideal of (3,4-epoxycyclohexyl)methyl 3,4-epoxycyclohexylcardrying operation for the solvent-borne coating. The activation temperature ought in that case to be at most 150° C., preferably, indeed, at most 100° C.

A series of thermally activatable initiators for the cationic curing of epoxides, for example, have been described in the past. In this context, the term (curing) catalyst is often also used instead of initiator. A multiplicity of commonplace curing systems for epoxides, however, are typically not suitable in the sense of the present invention. These include $BF_3$-amine complexes, anhydrides, imidazoles, amines, DICY, dialkylphenylacylsulfonium salts, triphenylbenzylphoshonium salts and amine-blocked phenylsulfonium acids. With many of these curing systems, the activation characteristics and/or curing characteristics cannot be suitably attuned to the production process for the self-adhesive tapes. For example, the pot life is inadequate or the required curing time or the performance profile is not attained.

Thermally activatable initiators which can be used in the sense of the present invention for cationic curing of cyclic ethers are, in particular, pyridinium salts such as N-benzylpyridinium salts or benzylpyridinium salts, ammonium salts such as anilinium salts (e.g. N-anisylmethyl-N,N-dimethylanilinium salt), sulfonium salts such as cyclohexyldiphenylsulfonium salt, dicyclopentenyldipropylsulfonium salt, p-methoxybenzyltetrahydrothiophenium salt, cyclopentyldiphenylsulfonium salt or, in particular, thiolanium salt, metal salt triflates such as triflates of calcium, of zinc, of aluminium, of the rare earths or of lanthanoids or mixtures thereof. Very advantageous are N-benzylpyridinium salts and benzylpyridinium salts, where aromatics may be substituted, for example, by alkyl, alkoxy, halogen or cyano groups. *J. Polym. Sci. A*, 1995, 33, 505ff, US 2014/0367670 A1, U.S. Pat. No. 5,242,715, *J. Polym. Sci. B*, 2001, 39, 2397ff, EP 393893 A1, *Macromolecules*, 1990, 23, 431ff, *Macromolecules*, 1991, 24, 2689, *Macromol. Chem. Phys.*, 2001, 202, 2554ff, WO 2013/156509 A2 and JP 2014/062057 A1 cite corresponding compounds which can be used with preference in the sense of this invention. Of the commercially available initiator systems, mention may be made, as examples of compounds that can be used very advantageously, of San-Aid SI 60 L, San-Aid SI 80 L, San-Aid SI 100 L, San-Aid SI 35 110 L, San-Aid B2A, San-Aid B3A, San-Aid B3 from Sanshin, Opton CP-66 and Opton CP-77 from Adeka, UVC 511, UVC 522, UVC 531, UVC 542, UVC 560 from Synlab GmbH and K-Pure TAG 2678, K-Pure CXC 1612, K-Pure CXC 1613 and K-Pure CXC 1614 from King Industries. Also able to be used very advantageously are lanthanoid triflates such as samarium (III) triflate, ytterbium(III) triflate, erbium(III) triflate, dysprosium (III) triflate, which are available from Sigma Aldrich, and lanthanum (III) triflate, which is available from Alfa Aesar. Suitable anions for the initiators that can be used include hexafluoroantimonate, hexafluorophosphate, hexafluoroarsenate, tetrafluoroborate and tetra(pentafluorophenyl)borate and also triflate. Additionally usable are anions according to JP 2012-056915 A1 and EP 393893 A1. The skilled person is aware of further systems which can likewise be used in the invention.

Thermally activatable initiators for the cationic curing are used uncombined or as a combination of two or more thermally curable initiators. Advantageous in the sense of the present invention are thermally activatable initiators which have an activation temperature of at least 25° C. and at most 200° C., preferably of at least 50° C. and at most 150° C., at which cationic curing of the reactive resins can be initiated. The activation time here may be 15 s or more and 15 min or less, although shorter or longer activation times are not ruled out. The curing operation may also continue to run after the activation time.

In one advantageous version of the invention, the curing reaction of the adhesive tape at the time of the lamination is substantially concluded in terms of the attainable conversion in the curing reaction. It is also possible for the curing operation at the time of lamination to be not yet concluded in terms of the attainable conversion in the curing reaction.

As photoinitiator, i.e. radiation-activatable initiator, it is possible for example to use compounds which absorb UV light below 350 nm and permit cationic curing, with the photoinitiator being selected in particular from sulfonium, iodonium and metallocene-based photoinitiators and a mixture thereof. Sulfonium-based photoinitiators are particularly preferred. As examples of sulfonium-based cations, reference may be made to the observations in U.S. Pat. No. 6,908,722 B1 (especially columns 10 to 21). Examples of anions which serve as counter-ions for the cations stated above include tetrafluoroborate, tetraphenylborate, hexafluorophosphate, perchlorate, tetrachloroferrate, hexafluoroarsenate, hexafluoroantimonate, pentafluorohydroxyantimonate, hexachloroantimonate, tetrakispentafluorophenylborate, tetrakis(pentafluoromethylphenyl)borate, bi-(trifluoromethylsulfonyl)amides and tris(trifluoromethylsulfonyl)methides. Further conceivable anions, especially for iodonium-based initiators, are chloride, bromide or iodide, although preferred initiators are substantially free from chlorine and bromine. More specifically, the systems which may be used include sulfonium salts (see, for example, U.S. Pat. Nos. 4,231,951 A, 4,256,828 A, 4,058, 401 A, 4,138,255 A and US 2010/063221 A1) such as triphenylsulfonium hexafluoroarsenate, triphenylsulfonium hexafluoroborate, triphenylsulfonium tetrafluoroborate, triphenylsulfonium tetrakis(pentafluorobenzyl)borate, methyldiphenylsulfonium tetrafluoroborate, methyldiphenylsulfonium tetrakis(pentafluorobenzyl)borate, dimethylphenylsulfonium hexafluorophosphate, triphenylsulfonium hexafluorophosphate, triphenylsulfonium hexafluoroantimonate, diphenylnaphthylsulfonium hexafluoroarsenate, tritolylsulfonium hexafluorophosphate, anisyldiphenylsulfonium hexafluoroantimonate, 4-butoxyphenyldiphenylsulfonium tetrafluoroborate 4-butoxyphenyldiphenylsulfonium tetrakis(pentafluorobenzyl)borate, 4-chlorophenyldiphenylsulfonium hexafluoroantimonate, tris(4-phenoxyphenyl)sulfonium hexafluorophosphate, di-(4-ethoxyphenyl)methylsulfonium hexafluoroarsenate, 4-acetylphenyldiphenylsulfonium tetrafluoroborate, 4-acetyl-phenyldiphenylsulfonium tetrakis(pentafluorobenzyl)borate, tris(4-thiomethoxy-phenyl)sulfonium hexafluorophosphate, di(methoxysulfonylphenyl)methylsulfonium hexafluoroantimonate, di(methoxynaphthyl)methylsulfonium tetrafluoroborate, di(methoxy-naphthyl)methylsulfonium tetrakis(pentafluorobenzyl)borate, di(carbomethoxyphenyl)methyl-sulfonium hexafluorophosphate, (4-octyloxyphenyl)diphenylsulfonium tetrakis(3,5-bis-trifluoromethylphenyl) borate, tris[4-(4-acetylphenyl)thiophenyl]sulfonium tetrakis(penta-fluorophenyl)borate, tris(dodecylphenyl)sulfonium tetrakis(3,5-bistrifluoromethylphenyl)borate, 4-acetamidophenyldiphenylsulfonium tetrafluoroborate, 4-acetamidphenyldiphenylsulfonium tetrakis(pentafluorobenzyl)borate, dimethylnaphthylsulfonium hexafluorophosphate, trifluoromethyldiphenylsulfonium tetrafluoroborate, trifluoromethyldiphenylsulfonium tetrakis (pentafluorobenzyl)borate, phenylmethylbenzylsulfonium hexafluorophosphate, 5-methylthianthrenium hexafluorophosphate, 1-O-phenyl-9,9-dimethylthioxanthenium hexafluorophosphate, 1-O-phenyl-9-oxothioxanthenium tetrafluoroborate, 1-O-phenyl-9-oxo-thioxanthenium tetrakis (pentafluorobenzyl)borate, 5-methyl-10-oxothi-anthrenium tetrafluoroborate, 5-methyl-10-oxothianthrenium tetrakis (pentafluorobenzyl)borate and 5-methyl-10,10-dioxothianthrenium hexafluorophosphate, iodonium salts (see, for example, U.S. Pat. Nos. 3,729,313 A, 3,741,769 A, 4,250, 053 A, 4,394,403 A and US 2010/063221 A1) such as diphenyliodonium tetrafluoroborate, di(4-methylphenyl)iodonium tetrafluoroborate, phenyl-4-methylphenyliodonium tetrafluoroborate, di(4-chlorphenyl)iodonium hexafluorophosphate, dinaphthyliodonium tetrafluoroborate, di(4-trifluormethylphenyl)iodonium tetrafluoroborate, diphenyliodonium hexafluorophosphate, di(4-methylphenyl) iodonium hexafluorophosphate, diphenyliodonium hexafluoroarsenate, di(4-phenoxyphenyl)iodonium tetrafluoroborate, phenyl-2-thienyliodonium hexafluorophosphate, 3,5-dimethylpyrazolyl-4-phenyliodonium hexafluorophosphate, diphenyliodonium hexafluoroantimonate, 2,2'-di-phenyliodonium tetrafluoroborate, di(2,4-dichlorophenyl)iodonium hexafluorophosphate, di(4-bromophenyl)iodonium hexafluorophosphate, di(4-methoxyphenyl)iodonium hexa-fluorophosphate, di(3-carboxyphenyl)iodonium hexafluorophosphate, di(3-methoxy-carbonylphenyl)iodonium hexafluorophosphate, di(3-methoxysulfonylphenyl)iodonium hexafluorophosphate, di(4-acetamidophenyl)iodonium hexafluorophosphate, di(2-benzo-thienyl)iodoniumhexafluorophosphate, diaryliodonium tristrifluoromethylsulfonylmethide such as diphenyliodonium hexafluoroantimonate, diaryliodonium tetrakis(pentafluorophenyl)borate such as diphenyliodonium tetrakis(pentafluorophenyl)borate, (4-n-desiloxy-phenyh-phenyliodonium hexafluoroantimonate, [4-(2-hydroxy-n-tetradesiloxy)phen-yl]phenyliodonium hexafluoroantimonate, [4-(2-hydroxy-n-tetradesiloxy)phenyl]phenyliodonium trifluorosulfonate, [4-(2-hydroxy-n-tetradesiloxy)phenyl]phenyliodonium hexafluorophosphate, [4-(2-hydroxy-n-tetradesiloxy)phenyl] phenyliodonium tetrakis(penta-fluorophenyl)borate, bis(4-tert-butylphenyl)iodonium hexafluoroantimonate, bis(4-tert-butylphenyl)iodonium hexafluorophosphate, bis(4-tert-butylphenyl)iodonium trifluorosulfonate, bis(4-tert-butylphenyl)iodonium tetrafluoroborate, bis(dodecylphenyl)iodonium hexa-fluoroantimonate, bis(dodecylphenyl)iodonium tetrafluoroborate, bis(dodecylphenyl)iodonium hexafluorophosphate, bis(dodecylphenyl)iodonium trifluoromethylsulfonate, di(dodecyl-phenyl)iodonium hexafluoroantimonate, di(dodecylphenyl)iodonium triflate, diphenyliodonium bisulfate, 4,4'-dichlorodiphenyliodonium bisulfate, 4,4'-dibromodiphenyliodonium bisulfate, 3,3'-dinitrodiphenyliodonium bisulfate, 4,4'-dimethyldiphenyliodonium bisulfate, 4,4'-bissuccinimidodiphenyliodonium bisulfate, 3-nitrodiphenyliodonium bisulfate, 4,4'-dimethoxydiphenyliodonium bisulfate, bis(dodecylphenyl)iodonium tetrakis(penta-fluorophenyl)borate, (4-octyloxyphenyl)phenyliodonium tetrakis(3,5-bistrifluoromethyl-phenyl) borate and (tolylcumyl)iodonium tetrakis (pentafluorophenyl)borate, and ferrocenium salts (see, for example, EP 542 716 B1) such as n5-(2,4-cyclopentadien-1-yl)-[(1,2,3,4,5,6,9)(1-methylethyl)benzene]iron.

Examples of commercialised photoinitiators are Cyracure UVI-6990, Cyracure UVI-6992, Cyracure UVI-6974 and Cyracure UVI-6976 from Union Carbide, Optomer SP-55, Optomer SP-150, Optomer SP-151, Optomer SP-170 and Optomer SP-172 from Adeka, San-Aid SI-45L, San-Aid SI-60L, San-Aid SI-SOL, San-Aid SI-1 OOL, San-Aid SI-110L, San-Aid SI-150L and San-Aid SI-180L from San-shin Chemical, SarCat CD-1010, SarCat CD-1011 and Sar-Cat CD-1012 from Sartomer, Degacure K185 from Degussa, Rhodorsil Photoinitiator 2074 from Rhodia, CI-2481, CI-2624, CI-2639, CI-2064, CI-2734, CI-2855, CI-2823 and CI-2758 from Nippon Soda, Omnicat 320, Omnicat 430, Omnicat 432, Omnicat 440, Omnicat 445, Omnicat 550, Omnicat 550BL and Omnicat 650 from IGM Resins, Daicat II from Daicel, UVAC 1591 from Daicel-Cytec, FFC 509 from 3M, BBI-102, BBI-103, BBI-105, BBI-106, BBI-109, BBI-110, BBI-201, BBI, 301, BI-105, DPI-105, DPI-106, DPI-109, DPI-201, DTS-102, DTS-103, DTS-105, NDS-103, NDS-105, NDS-155, NDS-159, NDS-165, TPS-102, TPS-103, TPS-105, TPS-106, TPS-109, TPS-1000, MDS-103, MDS-105, MDS-109, MDS-205, MPI-103, MPI-105, MPI-106, MPI-109, DS-100, DS-101, MBZ-101, MBZ-201, MBZ-301, NAI-20 100, NAI-101, NAI-105, NAI-106, NAI-109, NAI-1002, NAI-1003, NAI-1004, NB-101, NB-201, NDI-101, NDI-105, NDI-106, NDI-109, PAI-01, PAI-101, PAI-106, P AI-1001, PI-105, PI-106, PI-109, PYR-100, SI-101, SI-105, SI-106 and SI-109 from Midori Kagaku, Kayacure PCI-204, Kayacure PCI-205, Kayacure PCI-615, Kayacure PCI-625, Kayarad 220 and Kayarad 620, PCI-061T, PCI-062T, PCI-020T, PCI-022T from Nippon Kayaku, TS-01 and TS-91 from Sanwa Chemical, Deuteron UV 1240 from Deuteron, Tego Photocompound 1465N from Evonik, UV 9380 C-D1 from GE Bayer Silicones, FX 512 from Cytec, Silicolease UV Cata 211 from Bluestar Silicones and Irgacure 250, Irgacure 261, Irgacure 270, Irgacure PAG 103, Irgacure PAG 121, Irgacure PAG 203, Irgacure PAG 290, Irgacure CGI 725, Irgacure CGI 1380, Irgacure CGI 1907 and Irgacure GSID 26-1 from BASF, UV 387C, UV 1240, UV 1242, UV 1244, UV 1707, UV 1708, UV 2257 from Synlab. The skilled person is aware of further systems, which may likewise be used in the invention.

Photoinitiators may be used uncombined or as a combination of two or more photoinitiators and/or thermal initiators. Advantageous photoinitiators are those which have an absorption of less than 350 nm and advantageously greater than 250 nm. Initiators which absorb above 350 nm, in the violet light range, for example, can likewise be used. Sulfonium-based photoinitiators are used with particular preference, as they have advantageous UV absorption characteristics. The activation time in this case is usually more than 1 s and typically less than 5 min, although shorter or longer activation times are not excluded. The curing process may also continue after the activation time. In one advantageous embodiment of the invention, the curing reaction of the adhesive tape at the time of lamination is substantially complete in terms of the attainable conversion in the curing reaction. It is also possible for the curing process not yet to be completed at the time of lamination in terms of the attainable conversion in the curing reaction. The photoinitiator is advantageously activated after the drying operation, if a solvent-borne formulation is being coated.

(c) Optional Further Constituents:

In the selection of additional materials for use, care is taken to ensure that no constituents and chemical structural groups affect the curing process of the reactive resin components so severely as not to ensure the required performance capacity of the formulation after the curing operation. For instance, in particular, (strong) nucleophiles or substances with a basic activity are shunned.

It is optionally possible, for example, to use at least one plasticizer. These more particularly are plasticizing resins, and very preferably polyterpene resins or hydrocarbon resins which are liquid at room temperature, preferably with a fraction of 1 to 5 wt %, based on the total weight of the total PSAs.

Additives which may, optionally, be typically utilised are as follows:
primary antioxidants such as, for example, sterically hindered phenols,
preferably with a fraction of 0.2 to 1 wt %, based on the total weight of the total PSA
secondary antioxidants, such as, for example, phosphites, thioesters or thioethers,
preferably with a fraction of 0.2 to 1 wt %, based on the total weight of the total PSA
process stabilisers such as, for example, C-radical scavengers,
preferably with a fraction of 0.2 to 1 wt %, based on the total weight of the total PSA
light stabilisers such as, for example, UV absorbers or sterically hindered amines, preferably with a fraction of 0.2 to 1 wt %, based on the total weight of the total PSA
processing assistants,
preferably with a fraction of 0.2 to 1 wt %, based on the total weight of the total PSA, and also
optionally further polymers, preferably elastomeric in nature; elastomers which can be utilised accordingly include, among others, those based on pure hydrocarbons, for example unsaturated polydienes such as natural or synthetically generated polyisoprene or polybutadiene, chemically substantially saturated elastomers such as, for example, saturated ethylene-propylene copolymers, α-olefin copolymers, polyisobutylene, butyl rubber, ethylene-propylene rubber, and also chemically functionalised hydrocarbons such as, for example, halogen-containing, acrylate-containing, allyl or vinyl ether-containing polyolefins, preferably with a fraction of 0.2 to 10 wt %, based on the total weight of the total PSA.

In one embodiment of the present invention, the PSA also comprises further additives; non-limiting examples include crystalline or amorphous oxides, hydroxides, carbonates, nitrides, halides, carbides or mixed oxide/hydroxide/halide compounds of aluminium, silicon, zirconium, titanium, tin, zinc, iron or the alkali metals/alkaline earth metals. These compounds are essentially aluminas, for example aluminium oxides, boehmite, bayerite, gibbsite, diaspore and the like. Phyllosilicates are very particularly suitable, examples being bentonite, montmorillonite, hydrotalcite, hectorite, kaolinite, boehmite, mica, vermiculite or mixtures thereof. Additionally, carbon blacks or other polymorphs of carbon, for instance carbon nanotubes. Also possible are silicas, advantageously precipitated silicas, surface-modified with dimethyldichlorosilane.

The adhesives may also be coloured with dyes or pigments. The adhesives may be white, black or coloured.

The PSA for the PSA layer may be foamable or may be present in foamed form. For this purpose, foaming agents may be provided in the formulate. Very preferred for use as foaming agents are microballoons in expanded or expandable form. However, it is also possible to use chemical foaming agents alone or in combination with other foaming agents. PSAs may also be foamed, or have been foamed, physically, i.e. by incorporation of gaseous or supercritically fluid substances or compositions.

Where foaming is envisaged, it takes place in particular through the introduction and subsequent expansion of microballoons.

"Microballoons" are understood to be hollow microbeads that are elastic and hence expandable in their ground state, having a thermoplastic polymer shell. These beads are filled with low-boiling liquids or liquid gas. Shell materials used are, in particular, polyacrylnitrile, PVDC, PVC or polyacrylates. Suitable low-boiling liquids are, in particular, hydrocarbons of lower alkanes, for example isobutane or isopentane, which are enclosed as a liquefied gas under pressure in the polymer shell.

Action on the microballoons, especially as a result of heat exposure, causes the outer polymer shell to soften. At the same time, the liquid blowing gas within the shell is converted into its gaseous state. The microballoons at this point undergo irreversible extension and three-dimensional expansion. Expansion is at an end when the internal and external pressures are in balance. Since the polymeric shell is conserved, the result is a closed-cell foam.

A large number of types of microballoon are available commercially, and differ substantially in terms of their size (6 to 45 μm diameter in the unexpanded state) and in the starting temperatures they require for their expansion (75 to 220° C.). An example of commercially available microballoons are the Expancel® DU products (DU=dry unexpanded) from Nouryon.

Unexpanded microballoon products may also be used in polymer-bound form as a masterbatch for example in ethylvinyl acetate with a microballoon concentration of around 65 wt %. Like the DU products, masterbatches are suitable for production of a foamed PSA of the invention.

A foamed PSA of the invention may also be produced with what are called preexpanded microballoons. With this group, the expansion takes place prior to incorporation into the polymer matrix. Preexpanded microballoons are available commercially for example under the Dualite® designation or with the product designation Expancel DE (dry expanded) from Nouryon.

In accordance with the invention, at least 90% of all the voids formed by microballoons preferably have a maximum diameter of 20 to 75 μm, more preferably of 25 to 65 μm. The "maximum diameter" refers to the maximum extent of a microballoon in any desired direction in space.

The diameter is determined on the basis of a cryofracture edge under a scanning electron microscope (SEM) at 500 times magnification. For each individual microballoon, the diameter is ascertained graphically.

Where foaming is carried out using microballoons, the microballoons can be supplied to the formulation as a batch, a paste or a blended or unblended powder. They may furthermore be present in suspension in solvent.

The fraction of the microballoons in the adhesive is between 0.5 wt % and 5 wt %, more particularly between 1.0 and 2.5 wt %, based in each case on the total composition of the total PSA. The figures refer to unexpanded microballoons.

A polymer composition utilised in the invention and comprising expandable hollow microbeads may additionally include non-expandable hollow microbeads. The only crucial factor is that virtually all of the gas-containing cavities are closed by a permanently impervious membrane, no matter whether this membrane consists solely of an elastic and thermoplastically stretchable polymer mixture or, for instance, of elastic glass which—within the spectrum of the temperatures possible in plastics processing—is non-thermoplastic.

Additionally suitable—and chosen independently of other additives—for the PSA of the invention are solid polymer beads, hollow glass beads, solid glass beads, hollow ceramic beads, solid ceramic beads and/or solid carbon beads ("carbon microballoons").

The sum total of the further ingredients which can be used optionally, relative to the total weight of the total PSA, is up to about 20 wt %, but may also be up to 15 wt % or up to 10 wt % or up to 5 wt %.

The present invention also embraces a cured pressure sensitive adhesive obtainable or obtained by curing a pressure sensitive adhesive as described above.

Adhesive Tapes:

The present invention also embraces an adhesive tape which comprises at least one layer of a pressure sensitive adhesive of the invention or cured pressure sensitive adhesive as described respectively above.

In one preferred embodiment, the adhesive tape is an adhesive transfer tape, which consists preferably of a single layer of a pressure sensitive adhesive or cured pressure sensitive adhesive as described respectively above.

In an alternatively preferred embodiment, the adhesive tape comprises at least one carrier, i.e. permanent carrier, bearing on at least one side, preferably both sides, an applied layer of a pressure sensitive adhesive or cured pressure sensitive adhesive as described respectively above. The carrier is preferably a foamed carrier, more particularly a polyolefin, polyurethane or polyacrylate foam carrier. Further preferred permanent carriers are film carriers, containing in particular thermoplastic polymers such as polyesters or polypropylene. Such permanent carriers may be mono- or biaxially oriented.

In the adhesive tapes, the external, exposed faces of the outer layers of adhesive may be furnished with double-sidedly nonstick-coated materials such as a release paper or a release film, also called liners. A liner (release paper, release film) is not part of an adhesive tape, but rather merely a means to its production, storage and/or for further processing by die-cutting. Furthermore, in contrast to an adhesive tape carrier, a liner is not fixedly joined to a layer of adhesive.

Preferably, all of the layers have substantially the form of a cuboid. With further preference, all of the layers are connected to one another over their full area. This connection may be optimised by the pretreatment of the carrier surfaces.

The general expression "adhesive tape" (pressure sensitive tape) in the sense of this invention embraces all sheet-like structures such as two-dimensionally extended films or film portions, tapes with extended length and limited width, tape portions and the like, and lastly also die-cuts or labels. The pressure sensitive adhesive strip therefore has a longitudinal extent (x-direction) and a widthwise extent (y-direction). The pressure sensitive adhesive strip also has a thickness (z-direction) which runs perpendicular to the two extents, with the widthwise extent and lengthwise extent being greater by a multiple than the thickness. The thickness is very largely the same, preferably exactly the same, over the entire superficial extent of the pressure sensitive adhesive strip, this extent being defined by length and width.

The adhesive tape of the invention is present more particularly in web form. A web is an object whose length (extent in x-direction) is greater by a multiple than the width (extent in y-direction) and along the entire length the width remains roughly and preferably exactly the same.

Formulations according to the invention are notable for good peel adhesion with enhanced thermal shear strength and so are particularly suitable for pressure sensitive adhesive tapes which are to be used in applications where these requirements apply. These are, for example, applications in the interior and exterior of a motor vehicle, electronic applications for devices which are sold in hot countries, and use as adhesive construction tapes which are exposed to severe heat in the summer. The adhesive tapes are particularly advantageous if they achieve the following performance profile (Table 2):

TABLE 2

Preferred performance profile of the adhesive tapes.

| | | | Required performance range | Preferred performance range |
|---|---|---|---|---|
| SAFT | Test I | Thermal shear strength | min. 150° C. | min. 170° C. |
| Peel adhesion | Test II | Bond strength | min. 4 N/cm | min. 7 N/cm |

Production Process:

The present invention also relates to a process for producing adhesive tape of the invention, in which a solvent-borne adhesive is coated and dried and the thermal curing of the adhesive takes place or is initiated during the drying operation. The thermal curing or its initiation therefore takes place preferably during the drying operation. The curing may alternatively be achieved by radiation, such as UV radiation in particular. UV initiation may take place independently of the drying. The skilled person is aware that in each case an initiator is to be used that is suitable for the thermal or photochemical curing.

The process for producing an adhesive tape is therefore preferably solvent-based. At least one solvent is preferably used which at a pressure of 1013 mbar has a boiling point of at least 75° C., preferably at least 90° C., and also has a Hildebrand parameter of greater than 7.5 $cal^{1/2}\ cm^{-3/2}$ and less than 10 $cal^{1/2}\ cm^{-3/2}$.

As solvent it is possible additionally and preferably to use a mixture of polar solvents such as, for example, ethyl acetate, methylethyl ketone (MEK), methylisobutyl ketone (MIBK), 2-pentanone and/or butyl acetate, and apolar solvents such as toluene, methylcyclohexane and/or benzine. In selecting the solvent for producing the solvent-based adhesive, prior to coating, the selection concepts typically known to the skilled person are employed.

Although solvent-based production processes offer advantages, solvent-free production processes are nevertheless also conceivable, especially those which embrace continuous mixing assemblies such as extruders.

EXAMPLES

In the invention and comparative examples, percentages refer to wt %, unless otherwise indicated. The formulation constituents add up in each case to 100 wt % with solvent being disregarded. Differing from this, figures for the amount of initiator used are based on the amount of reactive resin component used.

Raw Materials:

Raw materials used in the inventive and comparative examples were as follows (Table 3).

TABLE 3

| | Raw materials used in the inventive and comparative examples. | | |
|---|---|---|---|
| Elastomer component | Europrene Sol T6414 (Versalis) | Polystyrene-polybutadiene block copolymers | PS content: 40 wt % radial diblock content: 22 wt % $M_P$: 116 000 g/mol |
| | Globalprene 3522 (LCY) | Polystyrene-polybutadiene block copolymers | PS content: 23 wt % triblock diblock content: 78 wt % $M_P$: 170 000 g/mol |
| | Kraton D1116 (Kraton Performance Polymers) | Polystyrene-polybutadiene block copolymers | PS content: 23 wt %* radial diblock content 16 wt % $M_P$: 300 000 g/mol |
| | Kraton D1124 (Kraton Performance Polymers) | Polystyrene-polyisoprene block copolymers | PS content: 30% radial diblock content: 30 wt % $M_P$: 180 000 g/mol |
| | Kraton D1126 (Kraton Performance Polymers) | Polystyrene-polyisoprene block copolymers | PS content: 19 wt % radial diblock content: 30 wt % $M_P$: 155 000 g/mol |
| | Kraton HT1200 (Kraton Performance Polymers) | Polystyrene-polyisoprene block copolymers | PS content: 10 wt % radial diblock content: 15 wt % $M_P$: 658 000 g/mol |
| | Solprene S416 (Dynasol) | Polystyrene-polybutadiene block copolymers | PS content: 30 wt % radial diblock content < 10 wt % $M_P$: 207 000 g/mol |
| | Tufprene 315P (Asahi Kasei) | Polystyrene-polybutadiene block copolymers | PS content: 20 wt % triblock diblock content < 5 wt % $M_P$: 106 000 g/mol |
| | Vector 4113 (TSRC) | Polystyrene-polyisoprene block copolymers | PS content: 15 wt % triblock diblock content: 18 wt % $M_P$: 190 000 g/mol |
| Tackifier resin component | Piccolyte A115 (DRT) | Alpha pinene resin | Softening point: 115° C. DACP = +35° C. |
| | Regalite R1090 (Eastman Chemical) | Fully hydrogenated C9 hydrocarbon resin | Softening point: 90° C. DACP = +55° C. |
| Reactive resin component | 3,4-Epoxycyclohexyl-methyl 3,4-epoxy-cyclohexanecarboxy-late (Uvacure 1500, Allnex) | Cycloaliphatic diepoxide | $\delta_D = 17.74$ MPa$^{0.5}$ |
| | Bis((3,4-Epoxycyclo-hexyl)methyl) adipate (Sigma Aldrich) | Cycloaliphatic diepoxide | $\delta_D = 17.6$ MPa$^{0.5}$ |
| | Dicyclopentadiene diepoxide (Sigma Aldrich) | Cycloaliphatic diepoxide | $\delta_D = 17.84$ MPa$^{0.5}$ |
| | 1,5-Hexadiene diepoxide (Sigma Aldrich) | Aliphatic diepoxide | $\delta_D = 17.3$ MPa$^{0.5}$ |
| | Diglycidyl-1,2-cyclo-hexane dicarboxylate (Sigma Aldrich) | Cycloaliphatic diepoxide | $\delta_D = 17.6$ MPa$^{0.5}$ |
| | Neopentyl glycol diglycidylether (Sigma Aldrich) | Aliphatic diepoxide | $\delta_D = 17.64$ MPa$^{0.5}$ |
| | Perhydrobisphenol A diglycidyl ether (ER15, IPOX) | Hydrogenated aromatic diepoxide | $\delta_D = 17.42$ MPa$^{0.5}$ |
| | 4,4'-Isopropylidene-diphenol-epichloro-hydrin (Epikote 828, Hexion Specialty Chemicals) | Aromatic diepoxide | $\delta_D = 18.9$ MPa$^{0.5}$ |
| Curing component | K-Pure CXC 1613 (King Industries) | Thermal initiator (a Zn triflate), in the form of a 25 wt % strength solution in 2-butanol | |
| | p-Methoxybenzyl-tetrahydrothio-phenium hexafluoro-antimonate (UVC 531, Synlab GmbH Friesoithe) | Thermal initiator | |
| | Irgacure 290 (BASF SE) | Sulfonium-based photoinitiator | |
| Further compounds used | Wingtack 10 (Cray Valley) | C$_5$ plasticizer resin | |
| | Expancel 920 DUT40 (Nouryon) | Expandable microballoons | |

Production and Properties of the Adhesive Tape Specimens:

For the production of the adhesive tape specimens of Examples I1 to I18 and comparative Examples C1 to C22, all of the formulation constituents required in each case (as set out in Table 3) were dissolved in a solvent mixture of ethyl acetate/toluene/benzine (14 wt % 30 wt %/56 wt %). The initiator was added either as supplied (K-Pure CXC 1613 solution) or in an in-house dissolved form (UVC 531 or Irgacure 290, each as a 33 wt % strength solution in methyl ethyl ketone) and incorporated for 30 min using a propeller stirrer. The solvent content in the resultant solution was 40 wt % in each case. Each solution was then coated onto a siliconized PET film.

The specimens were initially dried for 10 min at room temperature and then dried for 15 min at 120° C., unless otherwise indicated. After the drying, or drying and foaming, the adhesive film thickness of the coats was 50 μm (within the bounds of the usual error margins). After 24 h, the adhesive tape specimens were evaluated. Details of the investigations can be found in particular in the Test Methods Section.

I: Comparative Examples C1 to C22 a) Formula Optimisation:

In comparative Examples C1 to C10, the amounts used of the constituents of the base formulation, i.e. of the elastomer component, the tackifier resin component and the reactive resin component, and also of the initiator for the cationic curing of the reactive resin, were varied with the objective of optimising the thermal shear strength (SAFT) and peel adhesion on steel. The composition of the adhesive tapes from comparative Examples C1 to C10 and their properties are shown in Table 4.

TABLE 4

Composition and properties of the adhesive tapes from comparative Examples C1 to C10.

| Ex. (comp.) | Kraton D1116 (wt %) | Global-Prene 3522 (wt %) | Piccolyte A115 (wt %) | Uvacure 1500 (wt %) | K-Pure CXC 1613[a] | SAFT (° C.) | Peel adhesion Steel (N/cm) |
|---|---|---|---|---|---|---|---|
| C1 | 50 | 0 | 50 | 0 | 0 | 139 | 8.4 |
| C2 | 26 | 0 | 54 | 20 | 0 | 98 | 0.8 |
| C3 | 25 | 0 | 65 | 10 | 3 | 103 | 5.7 |
| C4 | 35 | 0 | 53 | 12 | 3 | 127 | 12.55 |
| C5 | 30 | 15 | 40 | 15 | 3 | 129 | 6.8 |
| C6 | 45 | 0 | 48 | 7 | 3 | 132 | 9.3 |
| C7 | 35 | 10 | 40 | 15 | 3 | 134 | 6.5 |
| C8 | 50 | 0 | 50 | 0 | 3 | 140 | 9.6 |
| C9 | 30 | 0 | 35 | 35 | 3 | 210 | 0.1 |
| C10 | 50 | 0 | 30 | 20 | 3 | 213 | 1.7 |

[a]Fraction of K-Pure CXC 1613 solution in wt % based on the amount of reactive resin Uvacure 1500.

C1 shows a blend without Uvacure 1500 and thus without epoxide curing. A SAFT result of higher than 140° C. cannot be achieved here.

C2 shows additionally that the epoxide cannot react with thermal self-curing, since no initiator is present. The epoxide does not cure, and so the thermal stability is even poorer than for comparative formula C1. The epoxide here acts as a plasticizer.

C3 to C7 make it clear in particular that with regard to the fractions of the individual components there is only one specific corridor within which both an acceptable peel adhesion result and an outstanding thermal stability can be achieved. All results with these raw materials combinations exhibit a thermal shear strength which is too low.

C8 shows that the initiator on its own does not exert any effect on the achievement of the performance requirement.

C9 and C10 show, moreover, that too high a fraction of cured reactive resin leads to a sharp reduction in the peel adhesion, causing the adhesive tape to lose its pressure sensitive adhesive character.

b) Elastomer Screening:

In comparative Examples C11 to C15, the selected elastomer was varied. As well as 40 wt % of the respective elastomer, respectively 40 wt % of tackifier resin (Piccolyte A 115), 20 wt % of reactive resin (Uvacure 1500) and 3 wt % of initiator solution (K-Pure CXC 1613 solution), based on the amount of Uvacure 1500, were used. Table 5 shows the particular elastomer used and the SAFT temperature of the resultant adhesive tapes. Also reported, moreover, is the SAFT temperature produced when the reactive resin Uvacure 1500 is omitted from each adhesive formulation (with the amounts of the further constituents used remaining unchanged).

TABLE 5

Elastomers used in comparative Examples C11 to C15 and SAFT values of the resultant adhesive tapes.

| Ex. (Comp.) | Elastomer | Polymer type | Diblock fraction (wt %) | PS content (wt %) | Architecture | SAFT (° C.)[a] | SAFT (° C.)[b] |
|---|---|---|---|---|---|---|---|
| C11 | Solprene S416 | PS polybutadiene | <10 | 30 | Radial | 98 | 131 |
| C12 | Kraton D1126 | PS-polyisoprene | 30 | 19 | Radial | 100 | 104 |
| C13 | Tufprene 315P | PS-polybutadiene | <5 | 20 | Linear (triblock) | 95 | 98 |
| C14 | Europrene Sol T 6414 | PS-polybutadiene | 22 | 40 | Radial | 97 | 118 |

TABLE 5-continued

Elastomers used in comparative Examples C11 to C15 and SAFT values of the resultant adhesive tapes.

| Ex. (Comp.) | Elastomer | Polymer type | Diblock fraction (wt %) | PS content (wt %) | Architecture | SAFT (° C.)[a] | SAFT (° C.)[b] |
|---|---|---|---|---|---|---|---|
| C15 | Kraton D1124 | PS-poly-isoprene | 30 | 30 | Radial | 90 | 119 |

[a]with Uvacure 1500; [b]without Uvacure 1500.

C11 to C15 show that there is only a small properties corridor for the elastomers within which epoxide compatibility of the polystyrene domains can be achieved.

c) Epoxide Screening:

In comparative Examples C16 to C22, the selected epoxide, i.e. reactive resin, was varied. As well as 20 wt % of the respective epoxide, respectively 40 wt % of elastomer (Kraton D1116), 40 wt % of tackifier resin (Piccolyte A 115), and 3 wt % of initiator solution (K-Pure CXC 1613 solution), based on the amount of epoxide, were used. Table 6 shows the particular epoxide used and the SAFT temperature of the resultant adhesive tapes.

C16 to C22 set out the important part played by the solubility of the epoxide in terms of its effect on the achievement of the performance requirement.

TABLE 6 epoxide (reactive resin) used in comparative Examples C16 to C22 and SAFT values of the resultant adhesive tapes.

| Ex. (comp.) | Epoxide | SAFT (° C.) |
|---|---|---|
| C16 | Bis((3,4-epoxycyclohexyl)methyl) adipate | 118 |
| C17 | 1,5-Hexadiene diepoxide | 113 |
| C18 | Diglycidyl 1,2-cyclohexanedicarboxylate | 110 |
| C19 | Neopentyl glycol diglycidyl ether | 113 |
| C20 | Dicyclopentadiene diepoxide | 105 |
| C21 | Perhydrobisphenol A diglycidyl ether | 98 |
| C22 | 4,4'-Isopropylidenediphenol-epichlorohydrin | 108 |

II: Inventive Examples I1 to I18 a) Inventive PSAs Based on Polystyrene-Polybutadiene Block Copolymers:

Table 7 shows the quantitative composition of the inventive adhesive tapes from Examples I1 to I14, whose elastomer in each case is a polystyrene-polybutadiene block copolymer in the form of Kraton D1116, and their properties.

TABLE 7

Composition of the inventive adhesive tapes from Examples I1 to I14 and their properties.

| Ex. | Kraton D1116 (wt %) | Piccolyte A115 (wt %) | Uvacure 1500 (wt %) | Wing-tack 10 (wt %) | K-Pure CXC 1613[a] | SAFT (° C.) | Peel adhesion (N/cm) |
|---|---|---|---|---|---|---|---|
| I1 | 42 | 45 | 13 | 0 | 3 | 150 | 8.7 |
| I2 | 42 | 40 | 13 | 5 | 3 | 153 | 7.2 |
| I3 | 35 | 45 | 15 | 5 | 3 | 156 | 11.4 |
| I4 | 35 | 50 | 15 | 0 | 3 | 160 | 13.3 |
| I5 | 41 | 40 | 14 | 5 | 3 | 161 | 7.3 |
| I6 | 26 | 54 | 20 | 0 | 3 | 165 | 12.03 |
| I7 | 29.5 | 50 | 20 | 0 | 3 | 183 | 14.3 |
| I8 | 35 | 40 | 20 | 5 | 3 | 196 | 8.7 |
| I9 | 35 | 45 | 20 | 0 | 3 | 200 | 10.2 |
| I10 | 43 | 37 | 20 | 0 | 3 | 221 | 5.6 |
| I11 | 45 | 35 | 20 | 0 | 3 | 240 | 5.0 |
| I12 | 33.5 | 46.5 | 20 | 0 | 3 | 210 | 10.0 |
| I13 | 40 | 40 | 20 | 0 | 3 | 180 | 6.5 |
| I14 | 40 | 40 | 20 | 0 | 1.5[b] | 180 | 6.5 |

[a]Fraction of K-Pure CXC 1613 solution in wt % based on the amount of reactive resin Uvacure 1500.
[b]Instead of 3 wt % of K-Pure CXC 1613 solution, 1.5 wt % of UVC 531 solution was used here, again based on the amount of Uvacure 1500.

Examples I1 to I14 show in particular that an inventive fraction of inventive reactive resin in a polystyrene-polybutadiene block copolymer matrix leads after curing to a high thermal shear strength, but at the same time also meets the requirements for good peel adhesion.

b) Inventive PSAs Based on Polystyrene-Polyisoprene Block Copolymers:

Table 8 shows the quantitative composition of the inventive adhesive tapes from Examples I15 and I16, whose elastomer is in each case a polystyrene-polyisoprene block copolymer in the form of Vector 4113, and their properties.

TABLE 8

Composition of the inventive adhesive tapes from Examples I15 and I16 and their properties.

| Ex. | Vector 4113 (wt %) | Regalite R1090 (wt %) | Uvacure 1500 (wt %) | K-Pure CXC 1613[a] | SAFT (° C.) | Peel adhesive Steel (N/cm) |
|---|---|---|---|---|---|---|
| I15 | 40 | 40 | 20 | 3 | 160 | 6.1 |
| I16 | 45 | 35 | 20 | 3 | 167 | 4.3 |

[a]Fraction of K-Pure CXC 1613 solution in wt % based on the amount of Uvacure 1500.

Examples I15 and I16 show that this concept can also be applied to polystyrene-polyisoprene block copolymer as a matrix polymer.

c) Inventive PSA Containing Photoinitiator:

A further adhesive tape, I17, was produced from 40 wt % of Kraton HT1200 as elastomer, 40 wt % of Regalite R1090 as tackifier resin and 20 wt % of Uvacure 1500 as reactive resin, with a thermal initiator being replaced by the use of a photoinitiator in the form of 9 wt % of Irgacure 290 solution, based on the reactive resin Uvacure 1500. The adhesive tape was produced as for the thermally cured adhesive tapes, with the curing taking place by subsequent irradiation with UV light on an Eltosch belt unit with a belt speed of 4 m/min, using a mercury-doped UV lamp with an output of 160 W/cm.

The resultant adhesive tape has a SAFT temperature of 212° C. and a peel adhesion on steel of 5.1 N/cm. Example 117 shows that curing can be carried out with a photoinitiator as well, instead of a thermal initiator.

d) Inventive PSA Foamed with Microballoons:

The production of adhesive tape I18 differs from the production of adhesive tape I13 in that the adhesive solution, before being coated onto a siliconised PET film, was admixed with 1.5 wt % of Expancel 920 DUT40 expandable microballoons, the microballoons being used in the form of a suspension in benzine. The weight fractions for the microballoons are based here on the dry weight of the solution used, to which they were added (i.e. the dry weight of the solution used is set at 100%). The initial drying for 10 min at room temperature and drying for 15 min at 100° C. produce an as yet unfoamed adhesive tape. The open side of the adhesive tape was then lined with a further ply of a siliconized PET film, and the adhesive tape was foamed for 1 min at 170° C.

The foamed adhesive tape has a SAFT temperature of 180° C. and a peel adhesion on steel of 5.7 N/cm. Example 118 shows that even adhesive tapes foamed with microballoons are able to have the desired profile of properties, such as, in particular, a high thermal shear strength.

Test Methods

All measurements were carried out, unless otherwise indicated, at 23° C. and 50% relative humidity.

The mechanical and technical adhesive data were ascertained as follows:

Test 1—Thermal Shear Strength (SAFT)

This test serves for rapid testing of the shear strength of adhesive tapes under temperature load. For this purpose, the adhesive tape under investigation is bonded to a temperature-controllable steel plate and loaded with a weight (50 g) and the shear distance is recorded.

Sample Preparation:

The adhesive tape under investigation (50 μm transfer tape) is bonded by one of the adhesive sides to an aluminium foil 50 μm thick. The adhesive tape thus prepared is cut to a size of 10 mm*50 mm.

The trimmed adhesive tape is bonded by the other adhesive side to a polished steel test plate cleaned with acetone (material 1.4301, DIN EN 10088-2, surface 2R, surface roughness Ra=30 to 60 nm, dimensions 50 mm*13 mm*1.5 mm), the bond being made such that the bond area of the sample in terms of height*width=13 mm*10 mm and the steel test plate protrudes by 2 mm at the upper edge. A 2 kg steel roller is subsequently rolled over the bond six times at a speed of 10 m/min for fixing it. The sample is reinforced flush at the top with a stable adhesive strip which serves as a contact point for the distance sensor. The sample is then suspended by means of the steel plate such that the longer-protruding end of the adhesive tape points vertically downwards.

Measurement:

The sample for measurement is loaded at the bottom end with a weight of 50 g. The steel test plate with the bonded sample is heated, starting at 25° C. at a rate of 9 K/min, to the final temperature of 200° C.

The distance sensor is used to observe the slip distance of the sample as a function of temperature and time. The maximum slip distance is set at 1000 μm (1 mm); if exceeded, the test is discontinued and the failure temperature is noted. Test conditions: room temperature 23+/−3° C., relative humidity 50+/−5%. The result is reported as the mean value from two individual measurements, in ° C.

Test II—Peel Adhesion

The investigation takes place in accordance with PSTC-1. A strip 2 cm wide and 15 cm long of the adhesive tape specimen with a thickness of 50 μm is lined on one of its adhesive sides with a PET film 25 μm thick and bonded by the other adhesive tape side to a polished steel plate (ASTM). A defined bond is ensured by rolling over the bond back and forth five times with a 4 kg roller. The plate is clamped in and the self-adhesive strip is peeled off via its free end on a tensile testing machine at a peel angle of 180° and at a speed of 300 mm/min. The test conditions are 23° C.+/−3° C./50%+/−5% r.H. The result reported is the mean value from three individual measurements, in N/cm.

Test III—Glass Transition Temperature of Polymer Blocks, DSC

The glass transition temperature of polymer blocks in block copolymers is determined by means of dynamic scanning calorimetry (DSC). For this determination, around 5 mg of the untreated block copolymer samples are weighed into a small aluminium crucible (volume 25 μl) and closed with a perforated lid. Measurement takes place using a DSC 204 F1 from Netzsch, operating under nitrogen for inertness. The sample is first cooled to −150° C., heated to +150° C. at a heating rate of 10 K/min, and cooled again to −150° C. The subsequent, second heating curve is run again at 10 K/min and the change in the heat capacity is recorded. Glass transitions are recognised as steps in the thermogram. The glass transition temperature is evaluated as follows: A tangent is applied in each case to the baseline of the thermogram before 1 and after 2 of the step. In the region of the step, a line 3 of best fit is placed parallel to the ordinate in such a way as to intersect the two tangents, specifically so as to form two areas 4 and 5 (between the respective tangent, the line of best fit, and the measurement plot), of equal area. The point of intersection of the line of best fit positioned accordingly and the measurement plot gives the glass transition temperature.

Test IV—Molar Mass, GPC (a) Peak Molar Mass of Individual Block Copolymer Modes:

GPC is appropriate as a metrological method for determining the molar mass of individual polymer modes in mixtures of different polymers. For the block copolymers which can be used for the purposes of this invention, produced by living anionic polymerisation, the molar mass distributions are typically narrow enough to allow polymer modes—which can be assigned to triblock copolymers, diblock copolymers or multiblock copolymers—to appear with sufficient resolution from one another in the elugram. It is then possible to read off the peak molar mass for the individual polymer modes from the elugrams.

Peak molar masses $M_P$ are determined by gel permeation chromatography (GPC). The eluent used is THF. The measurement is made at 25° C. The pre-column used is PSS- SDV, 10μ, ID 8.0 mm×50 mm. For separation, the columns used are PSS-SDV, 10μ, $10^3$ Å and also $10^5$ Å and $10^6$ Å each with ID 8.0 mm×300 mm. The sample concentration is 3 g/l, the flow rate 1.0 ml per minute. Measurement is made against PS standards. Calibration is carried out using the commercially available ReadyCal kit Poly(styrene) high from PSS Polymer Standard Service GmbH, Mainz, (μ=μm; 1 Å=$10^{-10}$ m).

(b) Weight-Average Molar Mass, Especially of Tackifier Resins:

The weight-average molecular weight $M_w$ (M.W.) is determined by gel permeation chromatography (GPC). The eluent used is THF. The measurement is made at 25° C. The pre-column used is PSS-SDV, 10μ, ID 8.0 mm×50 mm. For separation, the columns used are PSS-SDV, 10μ, $10^3$ Å and also $10^4$ Å and $10^6$ Å each with ID 8.0 mm×300 mm. The sample concentration is 3 g/l, the flow rate 1.0 ml per minute. Measurement is made against PS standards. Calibration is carried out using the commercially available ReadyCal kit Poly(styrene) high from PSS Polymer Standard Service GmbH, Mainz, (μ=μm; 1 Å=$10^{-10}$ m).

Test V—Resin Compatibility, DACP 5.0 g of test substance (the tackifying resin specimen under investigation) are weighed out into a dry test tube, and 5.0 g of xylene (isomer mixture, CAS [1330-20-7], ≥98.5%, Sigma-Aldrich #320579 or comparable) are added. The test substance is dissolved at 130° C. and the solution is then cooled to 80° C. Any xylene that has escaped is made up for with further xylene, so that 5.0 g of xylene are again present. Then 5.0 g of diacetone alcohol (4-hydroxy-4-methyl-2-pentanone, CAS [123-42-2], 99%, Aldrich #H41544 or comparable) are added. The test tube is shaken until the test substance has fully dissolved. For this, the solution is heated to 100° C. The test tube containing the resin solution is then introduced into a Novomatics Chemotronic Cool cloud point measuring instrument in which it is heated to 110° C. Cooling is carried out at a cooling rate of 1.0 K/min. The cloud point is detected optically. For this, the temperature at which the turbidity of the solution is 70% is registered. The result is reported in ° C. The lower the DACP, the higher the polarity of the test substance.

Test VI—Resin Compatibility, MMAP 5.0 g of test substance (the tackifying resin specimen under investigation) are weighed out into a dry test tube, and 10 ml of dry aniline (CAS [62-53-3], ≥99.5%, Sigma-Aldrich #51788 or comparable) and 5 ml of dry methylcyclohexane (CAS [108-87-2], ≥99%, Sigma-Aldrich #300306 or comparable) are added. The test tube is shaken until the test substance has fully dissolved. For this, the solution is heated to 100° C. The test tube containing the resin solution is then introduced into a Novomatics Chemotronic Cool cloud point measuring instrument in which it is heated to 110° C. Cooling is carried out at a cooling rate of 1.0 K/min. The cloud point is detected optically. For this, the temperature at which the turbidity of the solution is 70% is registered. The result is reported in ° C. The lower the MMAP, the higher the aromaticity of the test substance.

Test VII—Resin Softening Temperature

The determination of the tackifier resin softening temperature is carried out according to the relevant methodology, which is known as Ring & Ball and is standardised according to ASTM E28.

The invention claimed is:

1. Pressure sensitive adhesive comprising
   a) a base formulation containing
      (i) 25 to 45 wt % of at least one elastomer component containing at least one polyvinylaromatic-polydiene block copolymer,
         where the polyvinylaromatic-polydiene block copolymer at least fractionally has an A-B-A, $(A-B)_n$, $(A-B)_nX$ or $(A-B-A)_nX$ structure, in which
            the blocks A independently of one another are a polymer formed by polymerisation of at least one vinylaromatic,
            the blocks B independently of one another are a polymer formed by polymerisation of conjugated dienes having 4 to 18 carbon atoms or are a derivative of such a polymer that is partially hydrogenated in the polydiene block,
            X is the residue of a coupling reagent or initiator and
            n is an integer≥2,
         where the peak molar mass of the at least one polyvinylaromatic polydiene block copolymer according to Test IVa is at least 160 000 g/mol,
         where the fraction of A blocks in the at least one polyvinylaromatic polydiene block copolymer is at least 8 wt % and at most 25 wt % and where optionally there may be a fraction of diblock copolymer A-B, containing blocks A and B as defined above, of at most 25 wt %, based on the total elastomer component,
      (ii) 33 to 55 wt % of at least one tackifier resin component with at least one tackifier resin, where the at least one tackifier resin has a softening temperature (Ring & Ball, Test VII) of ≥80° C., and
      (iii) 13 to 30 wt % of at least one reactive resin component containing at least 70 wt % of at least one reactive resin based on a cyclic ether having a dispersive component of the Hansen parameter, $\delta_D$, of 17.50 to 17.82 $MPa^{1/2}$,
         based in each case on the base formulation, where the sum of the elastomer component and the reactive resin component is at least 38 wt % and at most 68 wt %,
   b) 0.1 to 5 wt %, based on the amount of reactive resin component, of at least one initiator for the cationic curing of the at least one reactive resin,
   c) optionally at least one plasticizer, and
   d) optionally at least one additive.

2. Pressure sensitive adhesive according to claim 1, wherein the polyvinylaromatic-polydiene block copolymer is a polystyrene-polybutadiene block copolymer, a polystyrene-polyisoprene block copolymer, or a polystyrene-polyfarnesene block copolymer.

3. Pressure sensitive adhesive according claim 1, wherein the polyvinylaromatic-polydiene block copolymer is a mixture of (i) triblock copolymer A-B-A or $(A-B)_2X$ and (ii) radial $(A-B)_nX$ block copolymer in which n is an integer≥3.

4. Pressure sensitive adhesive according to claim 1, wherein the dispersive component of the Hansen parameter, $\delta_D$, of the reactive resin differs by at most 2 $MPa^{1/2}$ from the dispersive component of the Hansen parameter, $\delta_D$, of the polyvinylaromatic of the at least one polyvinylaromatic-polydiene block copolymer.

5. Pressure sensitive adhesive according to claim 1, wherein the at least one reactive resin based on a cyclic ether is an epoxide or an oxetane.

6. Pressure sensitive adhesive according to claim 5, wherein the reactive resin based on a cyclic ether is aliphatic or cycloaliphatic in nature.

7. Pressure sensitive adhesive according to claim 1, wherein the initiator is selected from thermally activatable initiators for initiating a cationic curing, radiochemical initiators for initiating a cationic curing, and also mixtures of these.

8. Cured pressure sensitive adhesive obtainable or obtained by curing a pressure sensitive adhesive according to claim 1.

9. Adhesive tape which comprises at least one layer of a pressure sensitive adhesive according to claim 1.

10. Adhesive tape according to claim 9, which is an adhesive transfer tape.

11. Adhesive tape according to claim 9, wherein the adhesive tape comprises at least one carrier bearing on at least one side an applied layer of the pressure sensitive adhesive or of a cured pressure sensitive adhesive obtainable or obtained by curing the pressure sensitive adhesive.

12. Adhesive tape according to claim 11, wherein the carrier is a foam carrier.

13. Process for producing an adhesive tape according to claim 9, comprising coating and drying a solvent-borne adhesive, wherein thermal curing of the adhesive takes place or is initiated during the drying.

14. Process according to claim 13, in which at least one solvent is used which at a pressure of 1013 mbar has a boiling point of at least 75° C. and also has a Hildebrand parameter of greater than 7.5 $cal^{1/2}$ $cm^{-3/2}$ and less than 10 $cal^{1/2}$ $cm^{-3/2}$.

* * * * *